(12) United States Patent
Elms et al.

(10) Patent No.: US 8,574,351 B2
(45) Date of Patent: Nov. 5, 2013

(54) APPARATUS AND METHOD FOR GAS LIQUID SEPARATION IN OIL AND GAS DRILLING OPERATIONS

(71) Applicant: Haven Technology, Magnolia, TX (US)

(72) Inventors: David James Elms, Magnolia, TX (US); Gregory Allen Hudspeth, Amarillo, TX (US)

(73) Assignee: Haven Technology, Magnolia, TX (US)

( * ) Notice: Subject to any disclaimer, the term of this patent is extended or adjusted under 35 U.S.C. 154(b) by 0 days.

(21) Appl. No.: 13/846,256

(22) Filed: Mar. 18, 2013

(65) Prior Publication Data

US 2013/0220629 A1 Aug. 29, 2013

Related U.S. Application Data

(63) Continuation of application No. 13/020,623, filed on Feb. 3, 2011, now Pat. No. 8,419,833.

(51) Int. Cl.
*B01D 19/00* (2006.01)
(52) U.S. Cl.
USPC .................. 95/258; 95/261; 96/188; 96/208; 96/204; 166/357

(58) Field of Classification Search
USPC ........ 95/258, 261; 96/188, 208, 204; 166/357
See application file for complete search history.

(56) References Cited

U.S. PATENT DOCUMENTS

| | | | | |
|---|---|---|---|---|
| 2,049,578 | A * | 8/1936 | Werts | 96/159 |
| 5,749,945 | A * | 5/1998 | Beck | 95/248 |
| 7,905,946 | B1 * | 3/2011 | Weislogel et al. | 95/272 |
| 2010/0084352 | A1 * | 4/2010 | Pondelick et al. | 210/788 |

* cited by examiner

*Primary Examiner* — Duane Smith
*Assistant Examiner* — Douglas Theisen
(74) *Attorney, Agent, or Firm* — Haynes and Boone, LLP (57) ABSTRACT

A two phase gas-liquid separation apparatus is provided that shapes the flow in a flow shaping line. Shaping the two-phase flow allows centrifugal force to send the heavier, denser liquid to the outside wall of the flow shaping line and allows the lighter, less dense vapor or gas to occupy the inner wall of the flow shaping line. With the gas positioned on the inner wall of the flow shaping line, an exit port on the inner wall will allow for the majority, if not all, of the gas, along with a low amount of liquid, to be sent to a conventional separator. A high ratio of vapor/liquid at a flow rate much lower than the total flow rate within the flow shaping line is sent to the conventional separator. This allows for efficient separation of the vapor from the liquid with the use of a smaller conventional separator.

35 Claims, 8 Drawing Sheets

FIG. 10

APPARATUS AND METHOD FOR GAS LIQUID SEPARATION IN OIL AND GAS DRILLING OPERATIONS

This application is a continuation of and claims benefit to U.S. patent application Ser. No. 13/020,623, filed Feb. 3, 2011, entitled "APPARATUS AND METHOD FOR GAS LIQUID SEPARATION."

FIELD OF THE INVENTION

The present invention generally relates to the separation of gas from a gas-liquid two phase flow stream. More specifically, it relates to directionally shaping the gas-liquid two phase flow stream so that the majority of the gas is located in a certain area of the flow stream, which allows effective separation of the gas and the liquid.

BACKGROUND OF THE INVENTION

Figure 1A:
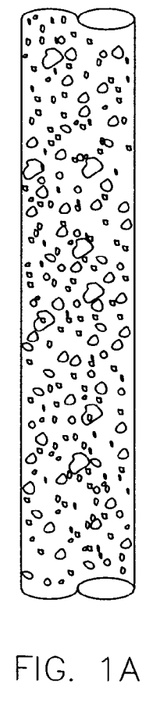
FIGS. 1A-1E illustrate a cross-sectional view of various flow regimes of two phase gas-liquid flow.
Figure 1B:
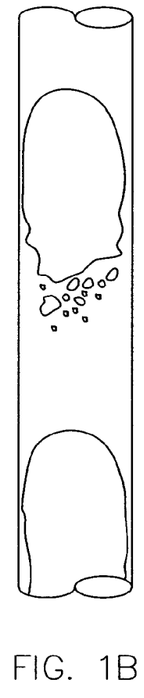
Figure 1C:
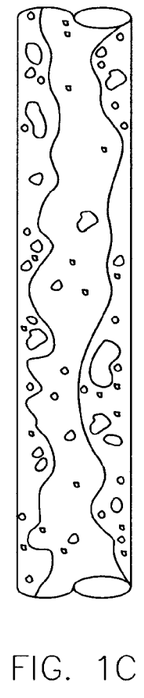
Figure 1D:
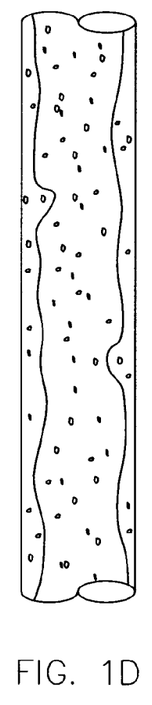
Figure 1E:
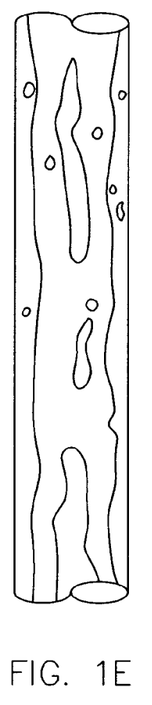

A gas-liquid two phase flow stream includes a mixture of different fluids having different phases, such as air and water, steam and water, or oil and natural gas. A gas-liquid two phase flow takes many different forms and may be classified into various types of gas distribution within the liquid. These classifications are commonly called flow regimes or flow patterns and are illustrated in FIGS. 1A-1E. Bubble flow as illustrated in FIG. 1A is typically a continuous distribution of liquid with a fairly even dispersion of bubbles in the liquid. Slug or plug flow as illustrated in FIG. 1B is a transition from bubble flow where the bubbles have coalesced into larger bubbles with a size approaching the diameter of the tube. Churn flow as illustrated in FIG. 1C is a pattern where the slug flow bubbles have connected to one another. In annular flow as illustrated in FIG. 1D, liquid flows on the wall of the tube as a film and the gas flows along the center of the tube. Finally, in wispy annular flow as illustrated in FIG. 1E, as the liquid flow rate is increased, the concentration of drops in the gas core increases, leading to the formation of large lumps or streaks of liquid.

It is often desirable to separate the gas and liquid components of a fluid from one another to enable proper operation of systems, such as certain types of liquid pumps. Conventional vertical or horizontal gas-liquid separators are available to separate gas from liquid. Conventional separators typically employ mechanical structures, wherein an incoming fluid strikes a diverting baffle which initiates primary separation between the gas and liquid components. Mesh pads or demister pads are then used to further remove suspended liquid. The sizing of a separator and the particular characteristics of the separator is dependent upon many factors, which may include, the flow rate of the liquid, the liquid density, the vapor density, the vapor velocity, and inlet pressure. Vertical separators are typically selected when the vapor/liquid ratio is high or the total flow rate is low. Horizontal separators are typically preferred for low vapor/liquid ratio or for large volumes of total fluid.

One application of these types of separators is in oil and gas drilling operations. Specifically, a mud-gas separator is used when a kick is experienced in a wellbore during drilling operations. A kick is the flow of formation fluids into the wellbore during drilling operations. If a kick is not quickly controlled, it can lead to a blow out. As part of the process for controlling a kick, the blow-out preventers are activated to close the wellbore and wellbore fluids are slowly circulated out of the wellbore while heavier drilling fluids are pumped into the wellbore. A mud gas separator is used to separate natural gas from drilling fluid as the wellbore fluid is circulated out of the wellbore. Often times, however, prior act separators, including mud-gas separators, cannot keep up with the flow rate from the wellbore.

Of course, separators are also used in the production of oil and gas to separate natural gas out of the oil that is being produced. Additionally, there are many other applications that require the use of gas-liquid separators.

SUMMARY OF THE INVENTION

This invention relates to directionally shaping two-phase mixed flow in a curved path within a flow shaping line prior to introduction into a separator so as to enhance operation of the separator. Shaping the two-phase flow in a curvilinear path will allow centrifugal force to more readily force the heavier, denser liquid to the outside wall of the flow shaping line in the curved path and allow the lighter, less dense vapor or gas to occupy the inner wall of the flow shaping line. Once the gas is fairly well positioned on the inner wall of the flow shaping line, an exit port located on the inner wall will allow for the majority, if not all, of the gas, along with a low amount of liquid, to be sent to a conventional separator. A very high ratio of vapor/liquid at a flow rate much lower than the total flow rate within the flow shaping line is then sent to the conventional separator. This allows for efficient separation of the vapor from the liquid with the use of a smaller, more economical conventional separator than what would have been required for the full flow rate.

Additionally, a fluid guiding surface may be placed on the inner wall of the flow shaping line at the exit port to further aid in directing the gas to flow to the conventional separator. Furthermore, the liquid return from the conventional separator may be arranged in close downstream proximity to the exit port on the inner wall of the flow shaping line. The close proximity of the liquid return and the exit port allows the use of a venturi, nozzle or other restriction located adjacent the liquid return in the flow shaping line just downstream of the exit port. The venturi, nozzle or other restriction accelerates the velocity of the liquid in flow shaping line as it flows across the exit port. This acceleration of the liquid helps to pull the liquid out of the conventional gas-liquid separator. In addition, the acceleration of the liquid within the flow shaping line helps to prevent any solids that may be present in the gas-liquid flow from entering the exit port and it helps to lower the amount of liquid that enters the exit port and thus enters the conventional separator.

The invention therefore allows a gas-liquid fluid to be effectively separated with the use of a smaller conventional separator than was previously possible. The invention accomplishes this without using additional complex mechanical devices and thus will operate efficiently and reliably.

BRIEF DESCRIPTION OF THE DRAWINGS

A more complete understanding of the present disclosure and advantages thereof may be acquired by referring to the following description taken in conjunction with the accompanying figures, wherein.

DETAILED DESCRIPTION

In the detailed description of the invention, like numerals are employed to designate like parts throughout. Various items of equipment, such as pipes, valves, pumps, fasteners, fittings, etc., may be omitted to simplify the description. However, those skilled in the art will realize that such conventional equipment can be employed as desired.

Figures 2, 3:
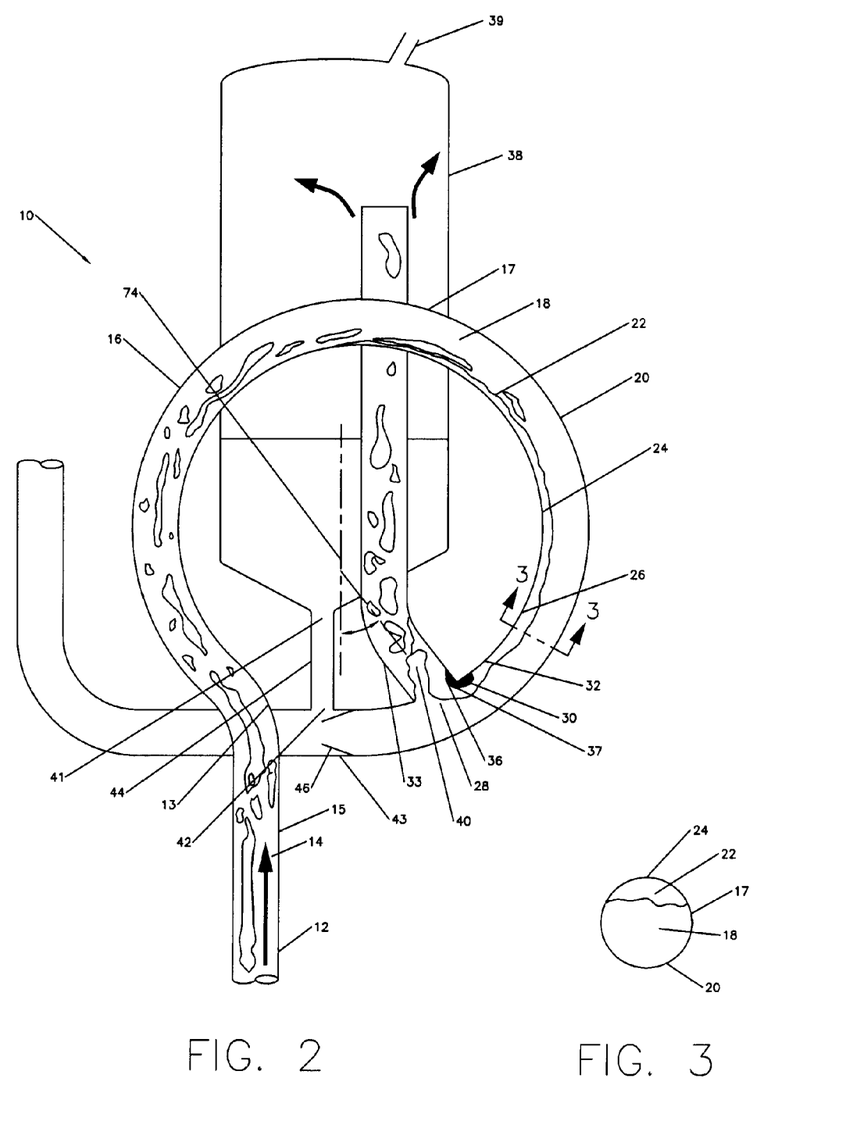
FIG. 2 illustrates a cross-sectional view of an embodiment of separation apparatus.
FIG. 3 illustrates a cross-sectional view of the embodiment of the separation apparatus in FIG. 2 taken across line 3-3.

FIG. 2 illustrates a cross-sectional view of an embodiment of a separation apparatus 10. In an exemplary embodiment, the separation apparatus 10 includes a gas-liquid flow 12 traveling in a vertical direction 14 in a main line 15. The gas-liquid flow 12 could be any type of multiphase gas-liquid flow regime or flow pattern, such as, for example, bubble flow, slug or plug flow, churn flow, annular flow or wispy annular flow. The gas-liquid flow 12 within main line 15 is directed into a circular flow path 16 in a flow shaping line 17. The circular flow path 16 of flow shaping line 17 creates an increased distribution of the gas on inner wall 24 of the flow shaping line 17. The increased distribution of the gas on the inner wall 24 of the flow shaping line 17 results in part by the relatively heavier and denser liquid 18 of flow 12 being forced to the outer wall 20 of the flow shaping line 17 due to centrifugal force of circular flow path 16, while the lighter gas 22 is driven to the inner wall 24. In an embodiment with a vertical or partly vertical orientation of the flow shaping line 17, gravitational effects may also aid in increasing the distribution of the gas on the inner wall 24 of the flow shaping line 17. In an embodiment, a transition section 13 between the main line 15 and flow shaping line 17 may be provided with a shape as illustrated to further aid in creating the increased distribution of the gas on inner wall 24 of the flow shaping line 17.

As the gas-liquid flow 12 continues to travel through the circular flow path 16 of flow shaping line 17, the gas-liquid flow 12 forms a flow path that exhibits a high concentration of the gas 22 on the inner wall 24 of the flow shaping line 17. In the embodiment shown in FIG. 2, at location 26, which is approximately 315 degrees around shaping line 17 (or 45 degrees from the vertical), the separation of gas 22 from liquid 18 has reached a degree that gas 22 primarily occupies the space adjacent the inner wall 24 of the flow shaping line 17. As seen in FIG. 3, which is a cross section 3-3 of the flow shaping line 17 and gas-liquid flow 12 at location 26, the gas 22 occupies mainly the inner wall 24 of the circular flow path 16 of the flow shaping line 17.

With gas-liquid flow 12 forming a more stratified flow regime, or at least the distribution or volume of gas near the inner wall 24 of the flow shaping line 17 has increased at the point of location 26, the gas 22 may now be effectively bled off from the gas-liquid flow 12 at an outlet port 28 positioned on the inner wall 24 of the flow shaping line 17. Although outlet port 28 may be positioned any where along flow path 16, it is preferably selected to be at a point where substantial separation of gas from liquid has occurred. Thus, in one preferred embodiment, the outlet port 28 is downstream of location 26. At about a location 26, which is approximately at an angle of approximately 45 degrees from the vertical 74, it has been found that the concentration, separation or stratification of the gas 22 from the liquid 18 is at a point that gas 22 occupies a greater volume of space adjacent the inner wall 24 of the main line 15 than liquid 18. In other embodiments, the outlet port 28 may be located between generally 45 degrees from the vertical and generally zero degrees with the vertical. While location 26 is illustrated at approximately 315 degrees around flow shaping line 17 and has been found to be a point where a substantial volume of gas has been driven to inner wall 24, location 26 is used for illustrative purposes only.

In an exemplary embodiment, a fluid guiding surface 30 is located on the inside diameter 32 of the inner wall 24 of the flow shaping line 17 upstream of the outlet port 28. The fluid guiding surface 30 includes a downstream end 36 that curves around the corner 37 located at the junction of the outlet port 28 and the flow shaping line 17. In one embodiment, the fluid guiding surface 30 may comprise at least a partial airfoil or hydrofoil shape. The fluid guiding surface 30 functions to guide the gas 22 into the outlet port 28. The gas 22 follows the contour of the fluid guiding surface 30 and the gas 22 will follow the curve of the downstream end 36 into the outlet port 28.

An amount of liquid 18 from the gas-liquid flow 12 will also be carried into the outlet port 28 thus forming a new gas-liquid flow 40 which includes a much lower percentage of liquid compared to the gas-liquid flow 12. The new gas-liquid flow 40 from outlet port 28 is then directed into a conventional gas-liquid separator 38, as shown in FIG. 2, for further separation of the gas and liquid. Outlet port 28 is connected to the conventional gas-liquid separator by separator inlet line 33. The gas-liquid separator 38 contains a gas exit 39 to allow for the removal of the gas 22 separated from the new gas-liquid flow 40. The gas-liquid separator 38 also contains a liquid exit 41 that is connected to liquid inlet port 42 in a return line 43 by a separator liquid exit line 44. The return line 43 is formed at the end of, and is fluidicly connected to, the flow shaping line 17. Those skilled in the art will appreciate that separation apparatus 10 is shown as integrated with gas liquid separator 38, but can be a completely separate structure.

In an exemplary embodiment, the liquid inlet port 42 in the return line 43 is in close downstream proximity to outlet port 28 of the flow shaping line 17. The close proximity of the liquid inlet port 42 and the outlet port 28 allows the use of a venturi 46 located adjacent the liquid inlet port 42 in the return line 43. The venturi 46 accelerates the velocity of the liquid 18 in return line 43 as it flows across the liquid inlet port 42. This acceleration of liquid 18 helps to draw the liquid out of the conventional gas-liquid separator 38. In addition, the acceleration of the liquid 18 within return line 43 facilitates separation of gas from liquid within flow shaping line 17, minimizes the likelihood that any solids present in the gas-liquid flow 12 will enter outlet port 28, and minimizes the amount of liquid 18 that enters the outlet port 28.

It has been observed that the liquid flow rate entering the outlet port 28 in the new gas-liquid flow 40 is approximately twenty percent of the of the flow rate of the gas-liquid flow 12 that is in the flow shaping line 17 upstream of the outlet port 28. The new gas liquid flow 40 contains a higher percentage of the gas 22 than was in the gas-liquid flow 12, but with much lower amount of liquid 18 in the flow. This provides a very efficient first step in the separation of the gas 22 from the liquid 18 without the use of additional pumps, valves or other mechanical equipment.

This efficient first step in the separation of the gas 22 from the liquid 18 is provided at least in part by one or more aspects of the invention. First, the use of the circular flow path 16 to centrifugally increase the concentration of the gas 22 on the inner wall 24 of the flow shaping line 17. Second is the fluid guiding surface 30 used to direct the gas 22 into the outlet port 28. Third, venturi 46 accelerates the velocity of the liquid 18 as it flows past the outlet port 28, thereby functioning to lower the amount of liquid 18 that enters the outlet port 28 and minimize entry of solids into outlet port 28. The venturi 46 also lowers the pressure of the liquid 18 at the liquid inlet port 42 of the return line 43, which draws the liquid 18 out of the conventional gas-liquid separator 38.

As mentioned above, the efficient first step in the separation of the gas 22 from the liquid 18 significantly decreases the amount of liquid 18 entering the conventional gas-liquid separator 38. This allows for the use of much smaller size conventional gas-liquid separators than would have previously been possible for a given flow rate.

While circular flow path 16 is shown as positioned in a vertical plane, in another embodiment the circular flow path 16 could be in a horizontal plane or in a plane with an inclination between horizontal and vertical.

Figure 4:
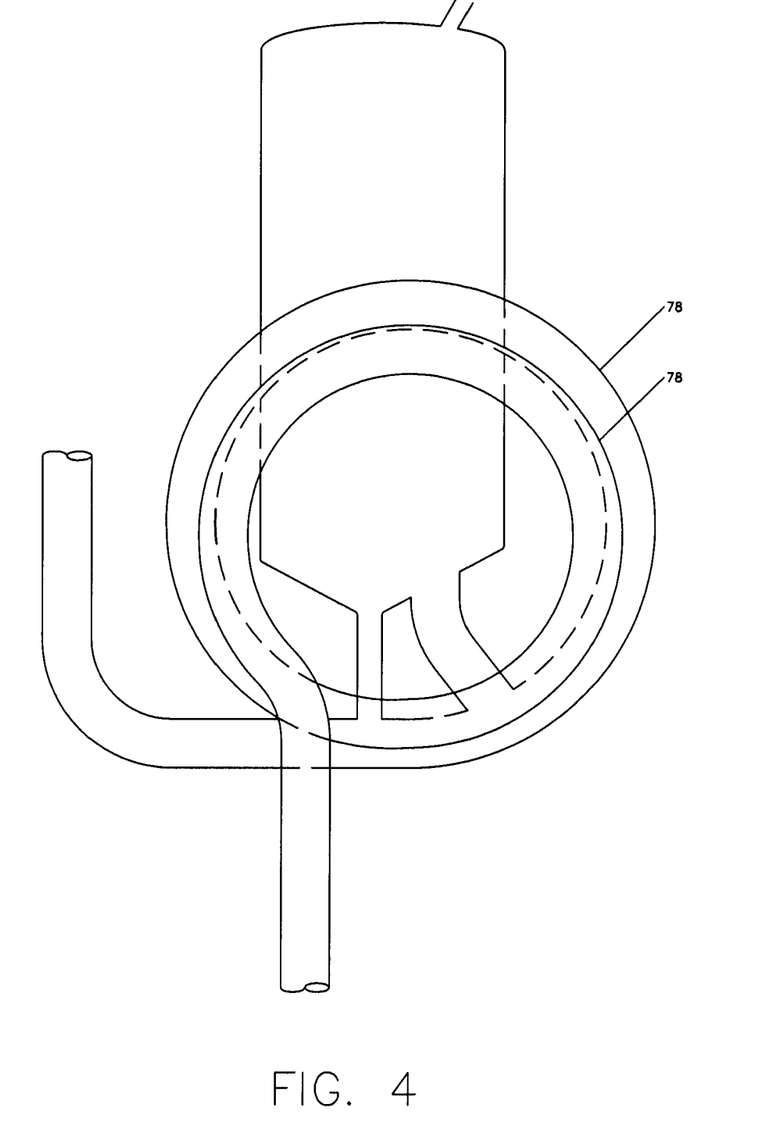
FIG. 4 illustrates a cross-sectional view of another embodiment of a separation apparatus with two flow shaping loops.
Figure 5:
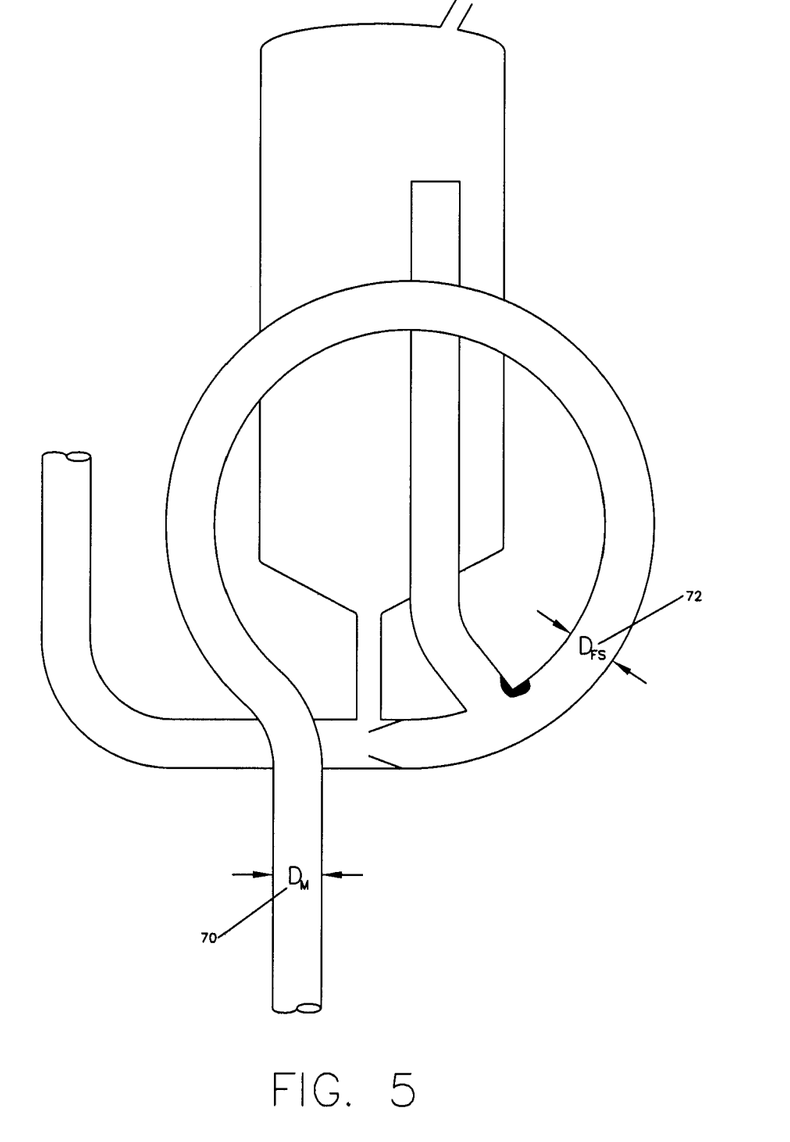
FIG. 5 illustrates a cross-sectional view of another embodiment of a separation apparatus where the diameter of the flow shaping line is less than the diameter of the main line.

In another embodiment, illustrated in FIG. 4, the circular flow path 16 could be replicated in multiple loops 78 to develop the increased concentration of the gas 22 on the inner wall 24 of the flow shaping line 17. In another embodiment as seen in FIG. 5, the flow shaping line 17 may be formed with a smaller cross-sectional area 72 than the cross sectional area 70 of the main line, thereby increasing the velocity of the gas-liquid flow 12 within the flow shaping line 17. The increase in velocity of the gas-liquid flow 12 results in greater centrifugal force and increased concentration of the gas 22 on the inner wall 24 of the flow shaping line 17. A higher velocity through the flow shaping line 17 also allows for greater turn-down capability in the flow rate of the gas-liquid 12 in a system where the flow rate may be variable.

Figure 6:
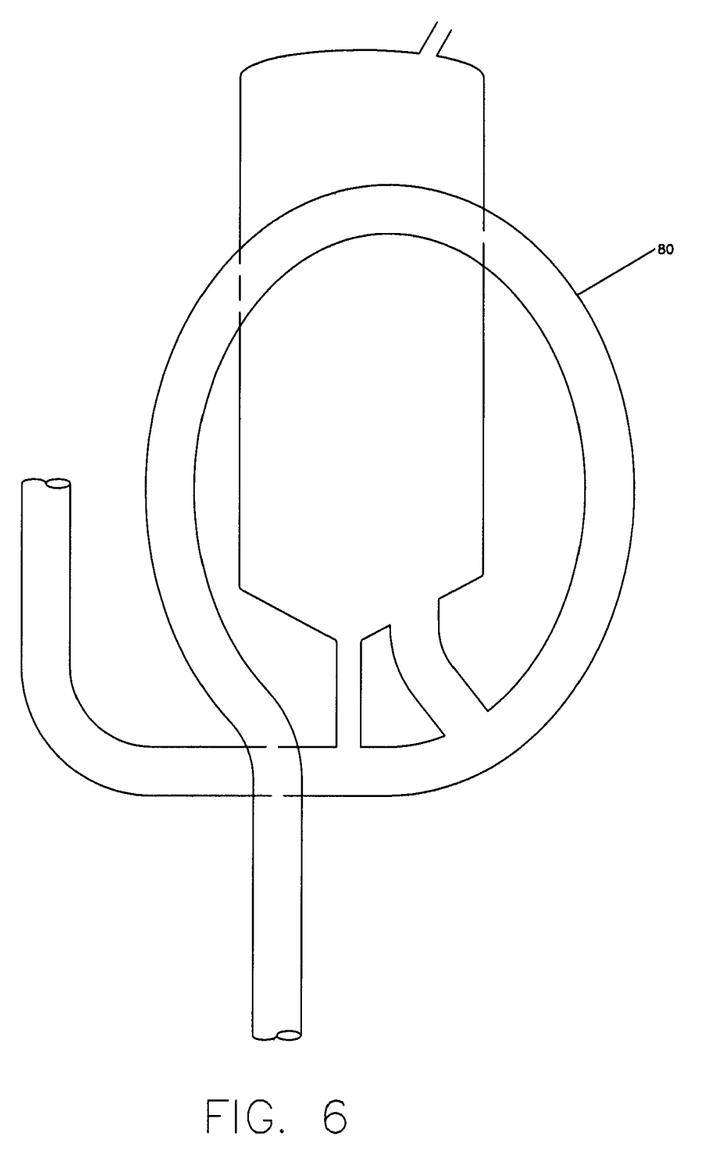
FIG. 6 illustrates a cross-sectional view of another embodiment of a separation apparatus where the flow shaping line forms a generally elliptical shape.

In other embodiments, as illustrated in FIG. 6, the flow pattern could be elliptical 80, or partially circular or partially elliptical, or some other curvilinear, non-circular shape that would still provide for increased concentration of the gas 22 on the inner wall 24 of the flow shaping line 17 through the use of centrifugal force.

Figure 7:
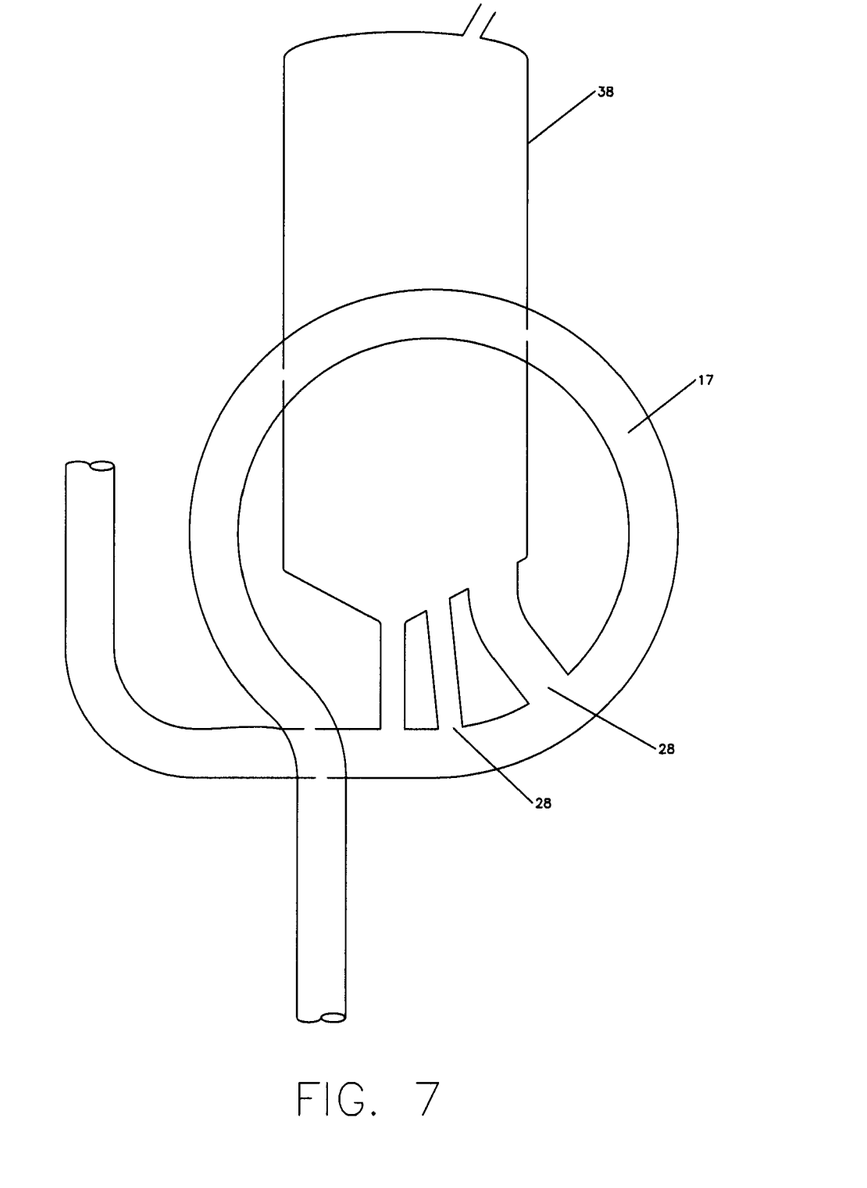
FIG. 7 illustrates a cross-sectional view of another embodiment of a separation apparatus with two exit ports.

As seen in FIG. 7, other embodiments of the invention may employ multiple outlet ports 28. For example, in one embodiment, an outlet port 28 may extend from the approximate bottom of a first loop, similar to the embodiment of FIG. 2, but the pipe may continue to make a second loop similar to the embodiment of FIG. 4, and have a similarly situated second outlet port 28 at the approximate bottom of the second loop. In addition, in another embodiment, one or more conventional separators may be used.

Figure 8:
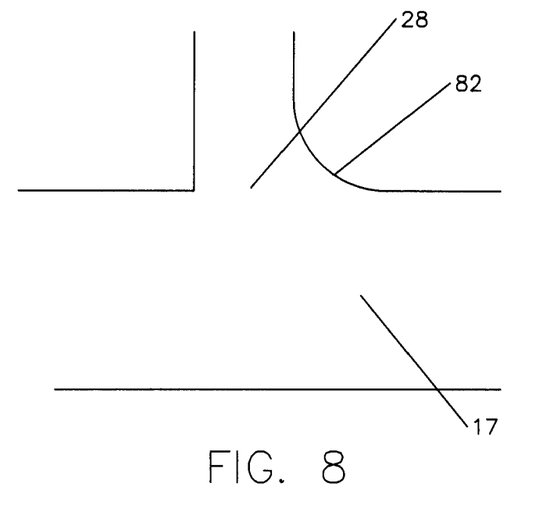
FIG. 8 illustrates a cross-sectional view of another embodiment of an exit port in a separation apparatus.
Figure 9:
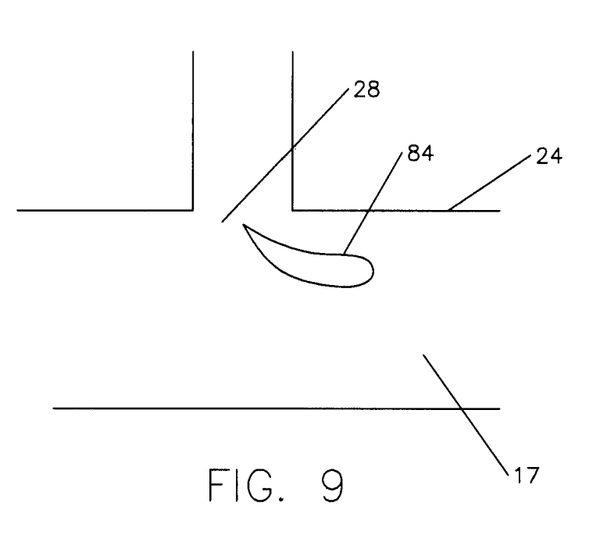
FIG. 9 illustrates a cross-sectional view of another embodiment of an exit port with an airfoil shape located away from the inner wall in an embodiment of a separation apparatus.

Other embodiments of the invention may eliminate the fluid guiding surface 30 or utilize other structures. For example, as illustrated in FIG. 8, in one embodiment, an outlet port 28 may have a curved entrance 82. In another embodiment illustrated in FIG. 9, a fluid guiding surface 84 could be spaced away from the inner wall 24 of the flow shaping line. In addition, other embodiments of the invention may use a nozzle or other type of restriction in lieu of a venturi to accelerate the fluid flow across the outlet port 28 or across the liquid inlet port 42, or may use no restriction at all.

Figure 10:
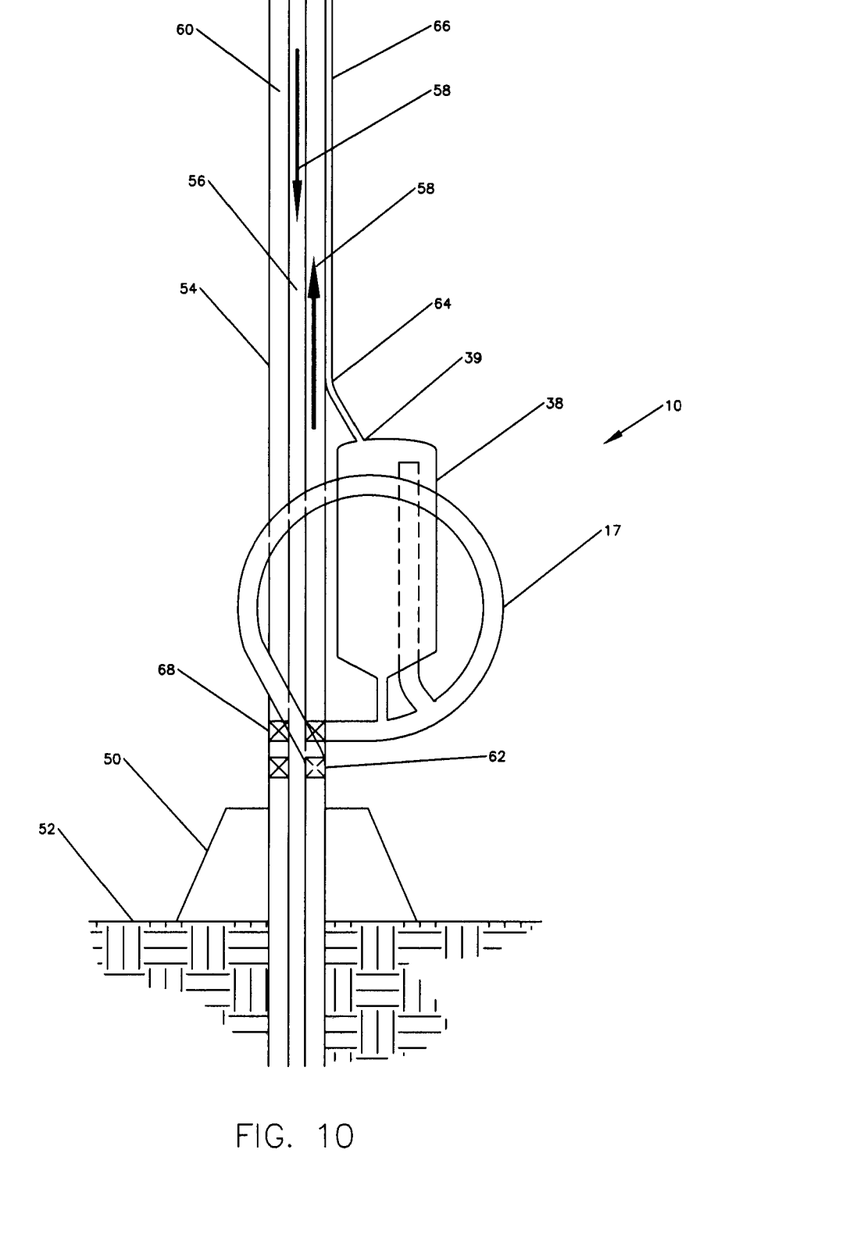
FIG. 10 illustrates a cross-sectional view of another embodiment of a separation apparatus located near the seabed in an oil and gas drilling operation.

As described above, one application for the invention is to protect against "kicks," such as in subsea applications, by circulating out hydrocarbon gas at the seabed floor before the gas is able to rise up to a drilling rig. Referring to FIG. 10, in an exemplary embodiment, illustrated is a conventional subsea blow out preventer 50 located on the seafloor 52. A marine riser 54 extends from the blow out preventer 50 and within the riser is a drillpipe 56. An embodiment of the separation apparatus 10 is positioned along drillpipe 56, preferably adjacent the blow out preventer 50. In normal drilling operations, drilling fluid 58 is pumped down the drillpipe 56 from the drilling rig (not shown) and returns to the drilling rig via annulus 60 formed between the drillpipe 56 and the riser 54. If a "kick" is detected, for example, by a change in the level of the mud tanks or increase in mud circulation rate, inlet annulus valve 62 is activated, diverting drilling fluid 58 from annulus 60 into the flow shaping line 17. Natural gas 64 entrained in drilling fluid 58 from the "kick" is then separated from the drilling fluid 58 by the separation apparatus 10 as described above. The natural gas 64 exits the gas-liquid separator 38 at the gas exit 39 and may flow up riser 66 to the drilling rig where it may be safely handled, for example, sent to a flare boom of the drilling rig (not shown), or compressed and re-distributed (also not shown).

Following separation of natural gas 64 from the drilling fluid 58 by separation apparatus 10, the drilling fluid 58 is re-introduced into the annulus 60 at an exit annulus valve 68. In comparison with the usual procedure of handling a kick, the use of an embodiment of this invention allows for full flow or circulation of the drilling fluid without having to choke down the flow or operate the blow out preventer valves.

In another embodiment, the inlet annulus valves 62 or exit annulus valves 68 can be eliminated, bypassed or operated so that the upward flowing drilling fluid 58 continually flows through the separation apparatus 10. Compared to the usual procedure on a drilling rig when there is a kick of choking the flow of the drilling fluid and being able to only send a portion of the flow to the mud-gas separator located on the drilling rig, an embodiment of the present invention allows the full flow of the drilling fluid to be handled by the separation apparatus 10 and the separation safely takes place near the seafloor.

The foregoing invention allows the use of a separation apparatus that can efficiently separate gas from a gas-liquid flow and do so at high flow rates and with the use of smaller conventional separators than would otherwise be possible at the high flow rates.

It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. A well system for separating gas from liquid in a gas-liquid flow from a wellbore drilled from a drilling rig, the system comprising:
   a blowout preventer;
   a riser extending from the blowout preventer; and
   a flow separation apparatus disposed along the riser and in fluid communication therewith, the flow separation apparatus comprising:

a first pipe having a first end and a second end, wherein at least a portion of the pipe between said first end and second end is curvilinear in shape so as to be characterized by an inner wall and an outer wall at said curvilinear portion of said pipe;

an outlet port disposed in said pipe along the inner wall between said first and second ends; and a gas separator in fluid communication with the outlet port.

2. The system of claim 1, further comprising a fluid guiding surface formed on the inner wall of the pipe adjacent said outlet port.

3. The system of claim 1, further comprising a foil disposed in said pipe adjacent said outlet port.

4. The system of claim 1, further comprising a restriction formed in the pipe between said outlet port and said second end.

5. The system of claim 4, wherein said restriction is adjacent said outlet port.

6. The system of claim 4, wherein said restriction is a nozzle.

7. The system of claim 1, wherein substantially all of the pipe between said first end and the outlet port is curvilinear.

8. The system of claim 1, said pipe having a liquid inlet disposed therein between said outlet port and said second end, said gas separator comprising a liquid return line, wherein said liquid return line is in fluid communication with said liquid inlet of said pipe.

9. The system of claim 8, further comprising a restriction formed in the pipe between said outlet port and said liquid inlet.

10. The system of claim 9, wherein said restriction is adjacent said liquid inlet.

11. The system of claim 10, wherein said restriction is a nozzle.

12. The system of claim 6, wherein said curvilinear pipe forms a circle around an axis, wherein said outlet port is disposed in said inner wall at a point between approximately 315 and 360 degrees around said axis.

13. The system of claim 1 further comprising a second pipe having a first end and a second end, wherein at least a portion of the second pipe between said first end and second end is curvilinear so as to be characterized by an inner wall and an outer wall at said curvilinear portion of said pipe, wherein the second end of the first pipe is in fluid communication with the first end of the second pipe.

14. The system of claim 1, wherein the curvilinear portion forms a pipe loop.

15. The system of claim 14, further comprising a plurality of pipe loops formed in the first pipe and arranged adjacent one another and in fluid communication with one another, each pipe loop characterized by an inner wall and an outer wall.

16. The system of claim 15, wherein each of the plurality of loops is disposed in a substantially vertical plane.

17. The system of claim 15, wherein the outlet port is upwardly extending and the gas separator is above the upwardly extending outlet port.

18. The system of claim 1, further comprising at least two outlet ports disposed in said pipe along the inner wall between said first and second ends, wherein each outlet port is in fluid communication with said gas separator.

19. The system of claim 4, wherein said curvilinear shape is substantially circular.

20. The system of claim 1, wherein the curvilinear portion of the pipe is formed around an axis and the outlet port is arranged to extend radially inward toward the axis.

21. The system of claim 1, wherein the curvilinear portion is disposed in a substantially vertical plane.

22. A well system for separating gas from liquid in a gas-liquid flow from a wellbore drilled from a drilling rig, the system comprising:

a blowout preventer;

a riser extending from the blowout preventer; and a flow separation apparatus disposed adjacent the blowout preventer, the flow separation apparatus comprising:

a first pipe having a first end and a second end, each end in fluid communication with the riser, wherein at least a portion of the pipe between said first end and second end is curvilinear in shape so as to be characterized by an inner wall and an outer wall at said curvilinear portion of said pipe;

an outlet port disposed in said pipe along the inner wall between said first and second ends;

a gas separator in fluid communication with the outlet port; and a first valve disposed between the riser and the first end of the pipe, the valve operable to control fluid flow between the riser and the pipe.

23. The system of claim 22, further comprise a second valve disposed between the riser and the second end of the pipe, the valve operable to control flow between the pipe and the riser.

24. The system of claim 22, further comprising a drill string disposed within the riser.

25. A method for recovering hydrocarbons from a wellbore, the method comprising:

directing a gas-liquid flow from a wellbore into a curvilinear flow path;

concentrating gas within a first portion of said flow path;

concentrating liquid within a second portion of said flow path;

separating said first portion of said flow path from said second portion of said flow path; and directing said first portion of said flow path into a gas separator.

26. The method of claim 25, further comprising increasing the velocity of said second portion of said flow path after separation from said first portion.

27. The method of claim 25, further comprising directing the second portion of the flow path into a riser.

28. The method of claim 25, further comprising directing drilling mud through a drill string into the wellbore.

29. The method of claim 26, further comprising a step of combining liquid from said gas separator with said second portion of said flow path down stream of the separation point of said flow paths, wherein the step of increasing the velocity of said second portion of said flow path occurs after separation from said first portion but prior to the step of combining liquid from said gas separator.

30. The method of claim 25, wherein the step of directing comprises passing a portion of the flow through a plurality of loops.

31. The method of claim 25, further comprising forming the curvilinear flow path below the surface of a body of water.

32. The method of claim 31, wherein the curvilinear flow path is formed adjacent the seabed of the body of water.

33. The method of claim 32, wherein the curvilinear flow path is formed above a blowout preventer positioned adjacent the seabed.

34. The method of claim 25, further comprising directing said second portion of said flow path into a marine riser.

35. The method of claim 25, further comprising detecting a kick in a wellbore system, and upon detection of a kick, performing the step of directing.

* * * * *